(12) United States Patent
Miller et al.

(10) Patent No.: US 12,525,112 B2
(45) Date of Patent: Jan. 13, 2026

(54) APPARATUS AND METHODS FOR AGGREGATED GAS DETECTION

(71) Applicant: BLACKLINE SAFETY CORP., Calgary (CA)

(72) Inventors: Justin Miller, Calgary (CA); Lohrasp Seify, Calgary (CA); Michael Briscoe, Calgary (CA)

(73) Assignee: BLACKLINE SAFETY CORP. (CA)

( * ) Notice: Subject to any disclaimer, the term of this patent is extended or adjusted under 35 U.S.C. 154(b) by 452 days.

(21) Appl. No.: 18/014,706

(22) PCT Filed: Jul. 6, 2021

(86) PCT No.: PCT/CA2021/050920
§ 371 (c)(1),
(2) Date: Jan. 5, 2023

(87) PCT Pub. No.: WO2022/006663
PCT Pub. Date: Jan. 13, 2022

(65) Prior Publication Data
US 2023/0298452 A1   Sep. 21, 2023

Related U.S. Application Data

(60) Provisional application No. 63/048,988, filed on Jul. 7, 2020.

(51) Int. Cl.
  *G08B 21/14*   (2006.01)
  *G01C 21/20*   (2006.01)
  *G01N 33/00*   (2006.01)

(52) U.S. Cl.
  CPC .......... *G08B 21/14* (2013.01); *G01C 21/206* (2013.01); *G01N 33/0031* (2013.01)

(58) Field of Classification Search
  CPC .......... G01N 33/0031; G01N 33/0075; G08B 21/14; G08B 21/043; G08B 21/0446; G08B 21/4092; G01C 21/206
  (Continued)

(56) References Cited

U.S. PATENT DOCUMENTS 6,885,299 B2   4/2005   Cooper et al.
7,688,198 B2   3/2010   Amidi
(Continued)

FOREIGN PATENT DOCUMENTS

BR   102017009920 A2 * 11/2018
CA   2900585 A1   6/2014
(Continued)

OTHER PUBLICATIONS

Andrade et al., BR 102017009920 A2 English translation (Year: 2018).*

(Continued)

*Primary Examiner* — John H Le
(74) *Attorney, Agent, or Firm* — Dilworth IP, LLC

(57) ABSTRACT

Apparatus and Methods for Aggregated Leak Detection. The method includes determining the location of multiple portable personal gas detectors as each gas detector is moved and monitoring the gas level associated with each determined location. This information is then collated by associating the transmitted location and associated gas levels. Zones of concern associated with elevated gas levels detected by multiple gas detectors are then identified.

19 Claims, 6 Drawing Sheets

(58) Field of Classification Search
USPC .......................................................... 702/188
See application file for complete search history.

(56) References Cited

U.S. PATENT DOCUMENTS

| | | | |
|---|---|---|---|
| 8,310,361 | B1 | 11/2012 | Stout et al. |
| 8,442,801 | B2 | 5/2013 | Gonla et al. |
| 9,612,195 | B1* | 4/2017 | Friedman ................ G08B 21/14 |
| 9,685,067 | B2 | 6/2017 | Shaw |
| 9,792,808 | B2 | 10/2017 | Gnanasekaran et al. |
| 10,210,738 | B2 | 2/2019 | Johnson, Jr. et al. |
| 10,360,728 | B2 | 7/2019 | Venkatesha et al. |
| 10,613,248 | B2 | 4/2020 | Benke et al. |
| 10,627,381 | B2 | 4/2020 | Kim et al. |
| 2012/0150755 | A1 | 6/2012 | Kumar et al. |
| 2014/0320296 | A1* | 10/2014 | Thurber ................. G08B 21/14 |
| | | | 340/632 |
| 2017/0089739 | A1 | 3/2017 | Gallo et al. |
| 2019/0234920 | A1 | 8/2019 | Rangel et al. |
| 2020/0020216 | A1 | 1/2020 | Slavin et al. |
| 2020/0064322 | A1 | 2/2020 | Park et al. |
| 2020/0169945 | A1 | 5/2020 | Crouthamel et al. |

FOREIGN PATENT DOCUMENTS

| | | | |
|---|---|---|---|
| JP | 2019160005 A | 9/2019 | |
| WO | 2017204642 A1 | 11/2017 | |

OTHER PUBLICATIONS

International Search Report and Written Opinion issued in International Application No. PCT/CA2021/050920, issued Sep. 14, 2021, 8 pages.

\* cited by examiner

APPARATUS AND METHODS FOR AGGREGATED GAS DETECTION

FIELD OF THE INVENTION

The invention relates to portable personal gas detector devices and associated methods and systems.

BACKGROUND

Gas detectors come packaged into two main form factors: portable devices and fixed gas detectors. Fixed type gas detectors are generally mounted near the process area of a plant or control room, or an area to be monitored. These industrial sensors are generally installed on fixed structures and connected by way of a supervisory control and data acquisition (SCADA) system for remote monitoring. The SCADA control operates with coded signals over a communication channel system for continuous monitoring (using typically one communication channel per remote station). On the other hand, portable detectors are used to monitor the atmosphere around personnel by affixing the gas detector to their clothing such as mounting on a waist belt. These gas detectors allow the individual to know, by way of transmitted warnings such as audible and visible signals, when dangerous levels of gas vapors are detected.

U.S. Pat. No. 7,688,198 discloses an external system which can use measured data and the location information to perform a wide variety of tasks, such as mapping hazardous materials in a processing or other environment or identifying trends in the concentration of the hazardous materials.

U.S. Pat. No. 8,442,801 discloses a location manager module may also use the gas readings and location information to create a gas concentration profile across a predetermined area.

SUMMARY

According to a first aspect, there is provided a method for detecting gas hazards comprising:
  repeatedly determining gas levels and associated locations of multiple portable personal gas detectors as each gas detector is moved;
  transmitting the determined gas levels and associated locations to a remote computer;
  collating the location and associated gas levels by the remote computer; and
  identifying, by the remote computer, one or more zones of concern associated with gas levels within a predetermined range detected by multiple gas detectors at different times.

The determination of the gas levels and locations may be carried out by the personal gas detectors. The association of the gas levels and locations may be carried out by the personal gas detectors. The personal gas detectors may be configured to determine locations as frequently or more frequently than the gas levels. The method may comprise determine a time associated with the gas level. The associated time may be determined by the personal gas detector.

The predetermined range may correspond to gas levels below a dangerous level and above a safe level.

The method may comprise updating the one or more zones of concern in response to receiving further information from one or more further gas detectors.

The remote computer (or remote device) may enable display of the zone (e.g. by displaying the zone boundary on a map). The remote computer may transmit the position and shape of the identified zone to another computer. The remote computer may transmit the type of gas associated with the identified zone. The remote computer may not transmit all the gas levels within the predetermined range and associated locations. That is, the remote computer may summarize the results of the analysis by sending details of the identified zone. This may reduce the quantity of data being transmitted and received. This may make the information easier to understand and respond to. The remote computer may be configured to determine a zone boundary to delimit an area within the zone and an area outside a zone.

The method may comprise providing feedback to the remote computer relating to whether or not the identified zone of concern was associated with a fault (e.g. at the time the zone of concern was identified); and using the feedback to automatically refine the criteria used to identify the zones of concern. The system may be configured to identify a zone based on one or more of: a cluster shape (e.g. the shape formed by the concern-level readings), periodicity (e.g. if the concern-level readings appear at regular intervals), temporal development (e.g. if the concern-level readings become more dangerous with time) and density distributions. The system may be configured to identify clusters within an ellipse or within an ellipsoid.

The refining may involve refining one or more of: the threshold for the minimum number of concern-level readings required to identify a zone of concern; the shape of the zone of concern; and the timings of the readings. That is, the remote computer may look for distinguishing characteristics common to multiple zones of concern confirmed as associated with a fault, and not typically found in zones of concern confirmed as not being associated with a fault.

The remote computer may use artificial intelligence and/or machine learning to refine the characteristics of a zone associated with a real threat. The remote device may learn the characteristics of a zone associated with a real threat by receiving feedback on whether or not a leak or other gas fault was found in a zone identified by the remote computer. For example, this may allow the remote computer to use previous experience to determine the typical shapes and temporal periodicity or development of a gas leak.

The method may comprise increasing the frequency at which the gas levels and associated locations are determined within a predetermined proximity around positions where gas levels within the predetermined range have already been detected. This may help increase the accuracy with which the boundary of the zone of concern are defined.

The method may comprise adjusting the frequency at which the gas levels and associated locations are determined within a predetermined proximity of an identified zone of concern. This may include adjusting the frequency of monitoring of portable personal gas detectors including those which have not yet detected gas levels within the predetermined range within the predetermined proximity, as described above. This may help increase the accuracy with which the boundary of the zone of concern are defined.

To control the frequency of monitoring, the remote computer may provide information to the portable personal gas detectors including those which have not yet detected gas levels within the predetermined range within the predetermined proximity. The remote computer may transmit information describing the zone of concern to each of the portable personal gas detectors. The information may include instructions to change the monitoring frequency based on the reported location of the gas detectors and/or location information of the predetermined range readings and/or location information of the predetermined proximity. The portable personal gas detectors may be configured to determine whether they are within the zone of concern by comparing their determined location with the received information.

The method may comprise providing an alert via one of the portable personal gas detectors in response to the portable personal gas detector remaining in an identified zone of concern for a period of time exceeding a threshold value. That is, although the threat may not be at a level to warrant an alarm to activated immediately, there may still be a risk which would increase if a user remains within the identified zone. Limiting the time within the zone may help reduce this risk. The identified-zone-time alert may have a different character to a dangerous-level alarm (e.g. different combination of sounds and lights). The alert may provide information to the user on how to exit the identified zone (e.g. directions to move, or a graphical display of the identified zone and the user's position within it).

The method may comprise notifying gas detectors within the identified zone of concern which do not have sensors configured to detect the gas associated with the identified zone of concern. The notification may provide information to the user on how to exit the identified zone (e.g. directions to move, or a graphical display of the identified zone and the user's position within it). The notification may provide information on the nature of the threat (e.g. type of gas).

Each portable gas detector may be configured to initiate an alarm if the gas level is within a predetermined dangerous-level range, and wherein the gas detector is configured to monitor and transmit gas levels corresponding to a concern-level range, the concern-level range being outside the dangerous-level range, and corresponding to a risk level below that of the dangerous-level range. That is, the method is configured to proactively identify potential risks, problems and/or faults before they become dangerous. It will be appreciated that the gas detector may be also configured to monitor and transmit gas levels corresponding to the dangerous-level range. the gas detector may or may not be configured to monitor and transmit gas levels corresponding to a safe-level range, the safe-level range being outside the dangerous-level and concern-level ranges and corresponding to the detected gas levels being safe for the user.

Each portable gas detector may be configured to adjust the frequency at which the gas levels and associated locations are determined in response to the monitored gas level passing between a concern-level range and a safe-level range. For example, if the monitored gas level passes from a concern-level range to a safe-level range, the frequency of gas-level determinations may be reduced. If the monitored gas level passes from a safe-level range to a concern-level range, the frequency may be increased. This may help increase the accuracy with which the boundary of the zone of concern are defined.

The remote computer may be configured to activate sensors within portable personal gas detectors.

The identified zone of concern may correspond to a zone in which more than 50% (or other predetermined proportion) of gas detectors in that zone detected gas levels within a predetermined range for an uninterrupted period of time. The predetermined proportion may be refined based on feedback on whether the identified zones correspond to identified faults.

The identified zone of concern may correspond to a zone which is surrounded by determined locations which are associated with normal gas levels.

The zones of concern may be identified based on one or more of:

the period of time over which gas levels within the predetermined range were detected (e.g. if successive concern-level readings are spread across a long time range, they may not be associated together to identify a zone of concern);

the number of gas levels readings within the predetermined range within a zone;

the number of detectors detecting gas levels within the predetermined range;

the number of detectors not detecting gas levels within the predetermined range; and the proximity of the locations associated with gas levels within the predetermined range.

A zone of concern may comprise a number of concern-level readings which are temporally and spatially clustered together.

The identified zones of concern may be given a risk score, the risk score being determined based on:

the period of time over which gas levels within the predetermined range were detected;

the number of gas levels readings within the predetermined range within a zone;

the number of detectors detecting gas levels within the predetermined range;

the number of detectors not detecting gas levels within the predetermined range; and the proximity of the locations associated with gas levels within the predetermined range.

The method may comprise, in response to an alarm being activated within the identified zone, determining a evacuation plan one or more gas detectors, the evacuation plan comprising a route from the current location of each gas detector to an end point, the route being configured to reduce the exposure to gas.

The method may comprise adapting criteria used to identify zones of concern, based on feedback provided on the accuracy of previous identifications.

The location may be determined using a global positioning system (e.g. GPS) and/or location beacons.

The gas detector may be configured to determine the gas levels based on a temporal frequency in an active mode, and based on a spatial frequency in a passive mode. That is, in an active mode, if the person is in one place, the gas detector will continue to determine gas levels. In contrast, in a passive mode, the gas detector may only determine gas levels if the user is moving. That is, the passive mode may be primarily used to map out spatial variations in gas levels, whereas the active mode may be used to determine temporal and spatial changes in gas levels. In other embodiments, the gas levels in both active and passive mode may be triggered based on a combination of spatial and/or temporal frequencies. Typically, the monitoring in the passive mode will have a lower frequency than that of the active mode.

Each gas detector may be configured determine the level of one or more of: carbon monoxide, hydrogen sulfide, nitrogen dioxide; airflow; and lower explosive limit (LEL).

The remote computer may be constrained to identify zones with a predetermined shape. The predetermined shape may be a quadrilateral, an ellipse or an ellipsoid. The zone may be constrained to have a convex shape (e.g. such that any straight line joining two points within the shape does not intersect the shape boundary).

The method may comprise transmitting, by the remote computer, the position and shape of the identified zone. The remote computer may transmit this information to a further computer and/or to the multiple portable personal gas detectors.

According to a further aspect, there is provided a system comprising:
- multiple portable personal gas detectors configured to repeatedly determine gas levels and associated locations of multiple portable personal gas detectors as each gas detector is moved, and to transmit the determined gas levels and associated locations to a remote computer; and
- the remote computer configured to collate the location and associated gas levels at the remote computer; and identify zones of concern detected by multiple gas detectors at different times.

An identified zone of concern may be an area or a volume. An identified zone may have an extent and a position. An identified zone may encompass positions which do not correspond to a gas level reading. That is, the underlying of the zone is to make connections between multiple readings from multiple detectors across different times and different positions. That is, the process aggregates this information and identifies a zone base on these distinct, but related, pieces of information.

The gas detector may be configured to send an alarm-mode signal to notify the remote computer that the alarm of the gas detector has been activated.

The gas detector may be configured to enable (e.g. initiate) two-way communication with the remote computer in response to a user interaction. The apparatus may be configured to enable multiple modes of voice communication. The remote computer may be configured to enable (e.g. initiate) two-way communication with the gas detector in response to the gas detector being within an identified zone of concern.

The remote computer may be a remote server. The server may be monitored by a plurality of computing devices connectable to the remote server. This allows one alert on the server to be seen by multiple potential helpers via the computing devices. The remote server may be configured to store data received from the portable personal gas detector in alert mode (e.g. including the two-way communication, threat data, location of user and/or time of threat being detected). The apparatus may be configured to restrict two-way communication being initiated by the portable personal gas detector for a period of time after detecting a threat.

The remote computer may be a central server, cloud or other computer. The remote computer (e.g. cloud) may make the information available at a variety of terminals (e.g. smartphone or computer via a log-in) via the internet.

A portable personal gas detector may comprise one or more threat sensors configured to measure environmental or user parameters and to activate an alarm if the measured environmental or user parameters go beyond a predetermined range.

A portable personal gas detector may comprise a controller configured to associate one or more possible threats with one or more locations, wherein the controller is configured to provide an indication of the possible threats based on the determined location of the portable personal gas detector.

The controller may be configured to notify the user if the one of more threat sensors are not configured to detect all of the possible threats associated with the determined location of the portable personal gas detector.

The location detector may comprise: a GPS module. The location detector may be configured to use local fixed-point anchor-node signaling to determine location (e.g. fixed Wi-Fi points). The location detector may use cellular networks to determine location. The location detector may comprise an indoor positioning system (IPS).

The one or more threat sensor may be configured to sense one or more of the following environmental parameters: concentration of a particular gas; airflow; temperature of the environment; humidity; radiant heat; and light intensity.

The one or more threat sensor is configured to sense one or more of the following user parameters: motion of the user; orientation of the user; heart rate of the user; time since user last initiated a report signal; and temperature of the user.

The gas detector or remote computer may be configured to activate and deactivate particular gas sensors based on its location (e.g. being a particular gas sensor within or in proximity to an identified zone of concern for the particular gas).

The gas detector or remote computer may be configured to send an alarm signal to other users in the vicinity of an alarm being activated.

The gas detector may be configured to change configuration settings based on certain parameters such as the determined location. This may include, for example, changing configuration settings based on certain criteria (moving from zone A to zone B, device location, time etc.).

The controller may be configured to store an association between one or more possible threats with one or more locations in advance of a threat being detected in the one or more locations.

The remote computer and portable personal gas detector may be configured to: determine an evacuation plan for each user in response to an alarm being activated, wherein the evacuation plan is based on reducing the exposure of the user to the gas as they move from a current position to a safe location.

The evacuation plan may comprise one or more of: a muster location; and an evacuation route.

The controller may be configured to determine an evacuation plan corresponding to each of the portable personal gas detectors.

Each portable personal gas detector may be configured to convey the determined evacuation plan to the user by providing audio and/or visual guidance.

A user may be, for example, one or more of the following:
- a person working at home such as telecommuters, affiliated marketers, writers;
- a person in the energy industry or oil and gas Industry including upstream workers like surveyors, land managers, drillers, and midstream or downstream workers such as refinery workers and drivers;
- a construction worker;
- a mobile worker such as traveling salesmen, truck drivers, health visitors, repair technicians;
- a person who works in any type of manufacturing facility;
- a person working outside normal hours such as security guards, cleaners;
- people with ongoing or potential medical issues;
- a utility worker such as meter readers or technicians;
- a self-employed person; and
- People who work apart from their colleagues such as receptionists, retail clerks, service station attendants.

A portable personal gas detector may include one or more of: processing circuitry, one or more motion or accelerometer sensors, one or more gyroscope or shock sensors, one or more two-way communication modules, one or more physiological sensors, one or more mode sensors, transmitter circuitry and receiver circuitry.

The device or system may comprise processing circuitry to calculate, assess and/or determine the environmental conditions of the user based on sensor data. The processing circuitry may include memory (for example, Flash memory, DRAM and/or SRAM) to store, and transmitter circuitry to send and receive information over the cellular, satellite or other such communication network, said sensor data and information which is representative of environmental conditions (for example, atmospheric carbon dioxide). The device, machine(s), processor(s) (suitably programmed) and/or field programmable gateways (or combinations of the aforementioned)) may be employed to calculate, determine, assess and/or determine the environmental risks for the user based on sensor data.

Sensors and networking circuits may include, for example, one or more accelerometers, gyroscopes, compasses, global positioning system receiver, short range wireless circuits which may include ANT or Bluetooth or other short range protocols, multicast wireless sensor, to calculate and/or detect the location of the user and transmit sensor data. Some devices are configured to use, for example, 3G and satellite wireless connections. This mitigates the need for Wi-Fi networks, infrastructure and/or Bluetooth connections.

The gas detector or system may be configured to enable the processes of calculating, obtaining, assessing and/or determining environmental conditions on or around the user based on certain sensor data.

The gas detector or system may be configured to enable the processes for calculating, obtaining, assessing and/or determining communication methods and alerts initiated by or on behalf the user and/or a 3rd party based on certain sensor data, according to certain aspects of the present disclosure.

The gas detector or system may be configured to enable the processes for calculating, obtaining, assessing and/or determining the environmental state of the user or surrounding the user based on sensor data, according to certain aspects of the disclosure.

The gas detector or system may be configured to enable the processes of generating alerts based on pre-determined levels or sensor thresholds.

The portable personal gas detector or system may be configured to use interchangeable sensors.

The gas detector may be battery powered. The gas detector may comprise a solar panel.

The gas detector may be configured to measure the relative amount of a gas in the atmosphere (e.g. as in this case where the carbon monoxide level is reported as a ratio), or to measure an absolute amount of gas (this may be important in low pressure environments, such as at altitude, where the relative amount of $O_2$ is acceptable but the total available oxygen is deficient).

The gas detector or system may comprise a user interface. The user interface may include one or more output mechanisms (for example, a display and/or speaker) and/or one or more input mechanisms (for example, a microphone, and sensor and tactile gesture recognition sensor(s). The user may acknowledge input data and/or commands from sensor related data); notably, any manner of and/or mechanism for outputting and/or inputting of data and/or commands (for example, responses to, for example, queries) are intended to fall within the scope of the present disclosure.

The portable gas detector may include one or more gas sensors and a two-way communication modem, and wherein the circuitry determines user state. The portable personal gas detector may also include one or more physiological sensors, one or more mode sensors, transmitter circuitry and/or receiver circuitry. For example, any portable personal gas detector of the present disclosure may employ or be implemented in any embodiment where the processing circuitry is disposed to enable connectivity with external sources.

The portable personal gas detector may be configured to disable or hide alerts/alarms under certain conditions (such as driving) automatically so that the user doesn't have to deal with them. The portable personal gas detector may be configured to recognize these certain conditions based on one or more of: the location of the device, the time, and the speed of the portable personal gas detector.

The portable personal gas detector may comprise a single unit. The portable personal gas detector may comprise multiple units in communication with each other. For example, the portable gas detector may comprise a gas detector unit in communication (e.g. wireless communication such as Bluetooth®) with a portable electronic device with a controller and a transmitter (e.g. a mobile phone or laptop).

A portable gas detector may comprise a controller comprising a processor and a memory having computer program code. A remote computer may comprise a controller comprising a processor and a memory having computer program code.

Also encompassed within the present disclosure are corresponding methods for using the gas detectors and systems described above.

Also encompassed within the present disclosure are computer programs for configuring the gas detectors and systems described above to perform their functions. Such computer programs may be stored on non-transitory media such as CDs.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 1b is a schematic of the components making up the gas detector of FIG. 1a.

DETAILED DESCRIPTION

Introduction

Figure 1A:
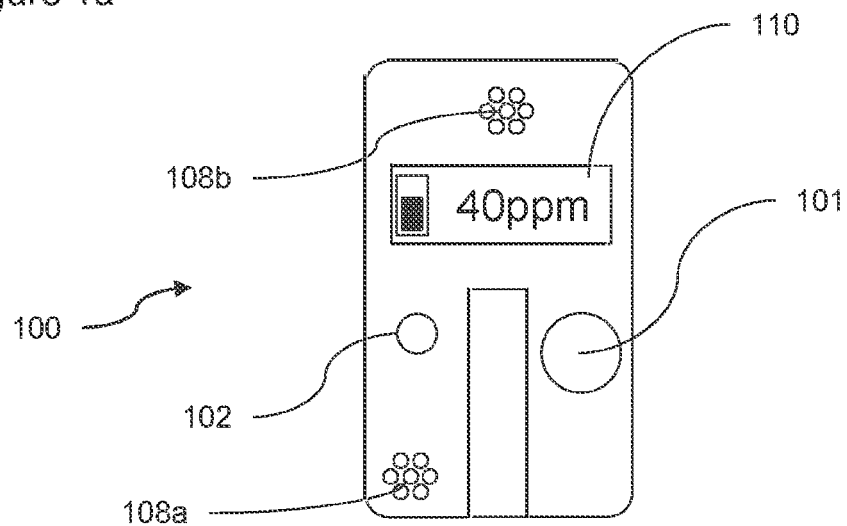
FIG. 1a is a front view of an embodiment of a portable personal gas detector.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Industrial chemicals leaked, spilled, or mishandled are common risks within environments such as manufacturing facilities. These facilities may have incorporated real-time gas detection monitors with man-down alarms.

The inventors have recognized a need for improved monitoring systems to improve the detection of gas levels with a view to preventing dangerous situations proactively. In particular, in an industrial site, where there are potentially dangerous chemicals and gases, it is normal practice for a worker to use a detector configured to reactively raise an alarm when a dangerous situation has already arisen. However, it would be preferable if a developing threat could also be identified before it became dangerous. The present technology addressed this by monitoring and identifying zones of concern by monitoring the environment using multiple portable personal gas detectors over time.

In the course of the detailed description to follow, reference will be made to the attached drawings. These drawings show different aspects of the monitoring systems and, where appropriate, reference numerals illustrating like structures, components, materials and/or elements in different figures are labeled similarly. It is understood that various combinations of the structures, components, and/or elements, other than those specifically shown, are contemplated and are within the scope of the present inventions.

Portable Gas Detector

FIG. 1a shows a portable personal gas detector 100. In this case, the portable personal gas detector comprises a gas sensor 101 configured to measure gas levels in the environment of the gas detector. In this case, the threat sensor comprises a carbon monoxide sensor. The level of threat is displayed on a display screen 110 of the gas detector 100.

The portable gas detector may include, in addition to one or more polymeric-type gas sensors, a singular or plurality of accelerometers, gyroscopes, temperature sensors, humidity sensors, and pressure sensors.

It will be appreciated that other threat sensors may be configured to sense one or more of the following environmental parameters: concentration of a particular gas (e.g. toxic gases such as carbon monoxide, hydrogen sulfide, nitrogen dioxide); airflow; lower explosive limit (LEL); the temperature of the environment; the humidity; radiant heat; and light intensity.

The portable personal gas detector may comprise other threat sensors configured to sense, for example, one or more of the following user parameters: motion of the user (e.g. to detect whether the user has stopped moving or is moving in an way indicative of a problem); orientation of the user (e.g. to detect if the user has fallen); heart-rate of the user; time since user last initiated a report signal; and temperature of the user.

Figure 1B:
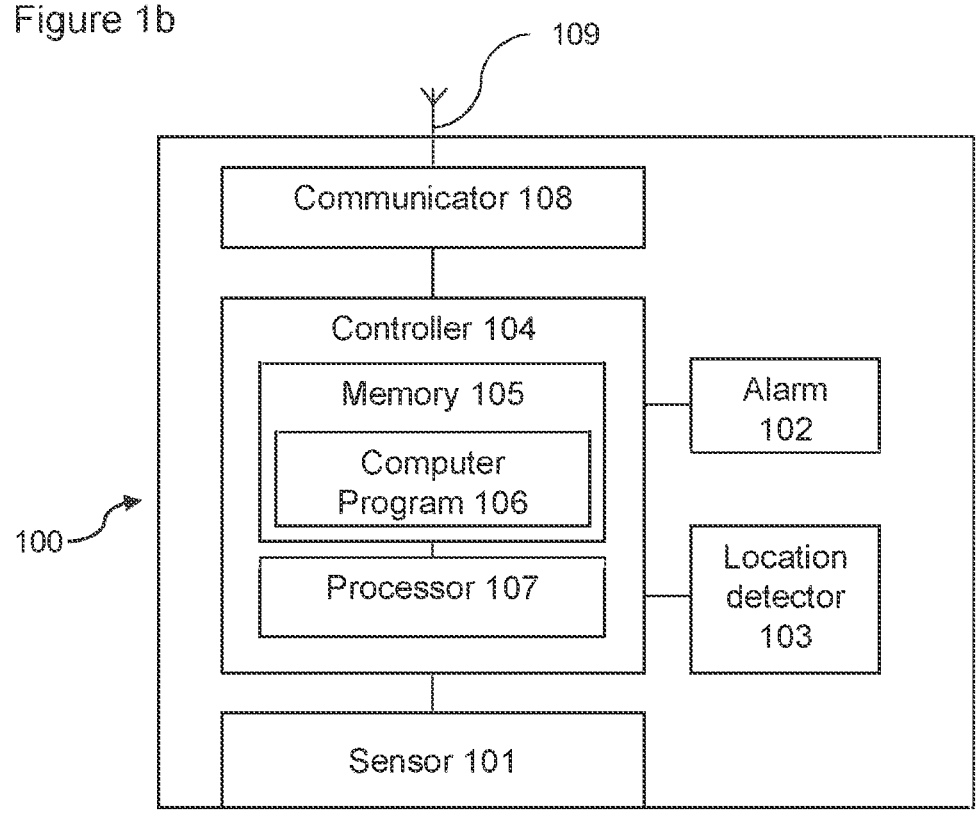

In this case, the sensor 101 of the portable personal gas detector is connected to a controller 104 (shown in FIG. 1b) comprising a processor 107 and a memory 105 having computer program code 106. The controller 104 is configured to activate an alarm 102 (in this case comprising a flashing light and an audio warning) if the gas levels, environmental or user parameters measured by the sensor 101 go beyond a predetermined range (e.g. corresponding to a dangerous level). In this case, the alarm 102 is configured to be activated in response to the carbon monoxide level being greater than 100 ppm (other values may be used such as 70 ppm). Both upper and lower alarm levels may be set.

In this case, the personal gas detector also includes a communicator comprising a microphone 108a and a speaker 108b configured to support two-way voice communication via a transceiver antenna 109 with a remote computer (e.g. a remote server or another personal gas detector of a 'buddy' nearby).

The personal gas detector is configured to communicate using a self-contained cellular communication module may help reduce or eliminate much of the required infrastructure to provide remote notification type of alarm monitoring. Cellular communication also provides the wearer of the portable personal gas detector the ability to articulate their situation to an emergency response team. Furthermore, self-monitoring of the gas detectors may enable a remote site to know whether it is operating properly.

Over-the-air communication offers tremendous advantages. Such a compact and light weight safety monitoring system, capable of detecting atmospheric gas and/or other measures of sensor inputs, could be easily carried or worn by personnel in the area of interest, being the gas detector would be capable of operating without a fixed install. Transmitting data in real-time may allow the gas detector to remain connected regardless of the environment or location where it is being used. It may also allow data from multiple portable personal gas detectors to be collated and processed in real-time which may be important in developing situations.

The communication transceiver 109 is configured to freely and continuously send and receive voice and data over the air. In this case, the transceiver 109 is a cellular transceiver configured to connect to a cellular or mobile network (e.g. T-Mobile, AT&T, Verizon, etc.). This may help allow communications to be established while operating without local infrastructure constrains, such as Wi-Fi, telephone or internet cables. Other embodiments may use satellite infrastructure (i.e. Globalstar, Iridium, etc.), and geospatial technologies, (i.e. global positioning systems) or Wi-Fi, telephone or internet systems. In this case, the portable personal gas detector also comprises a location detector 103 configured to determine the location of the portable personal gas detector 100. In this case, the location detector 103 of the portable personal gas detector 100 is configured to determine its location using a combination of a satellite-based positioning systems, and beacons positioned within the environment.

In addition to deactivating the ability to receive a call, the portable gas detector is configured to transmit data to one or more remote computers. In this case, the alert is transmitted via non-voice.

Figure 1C:
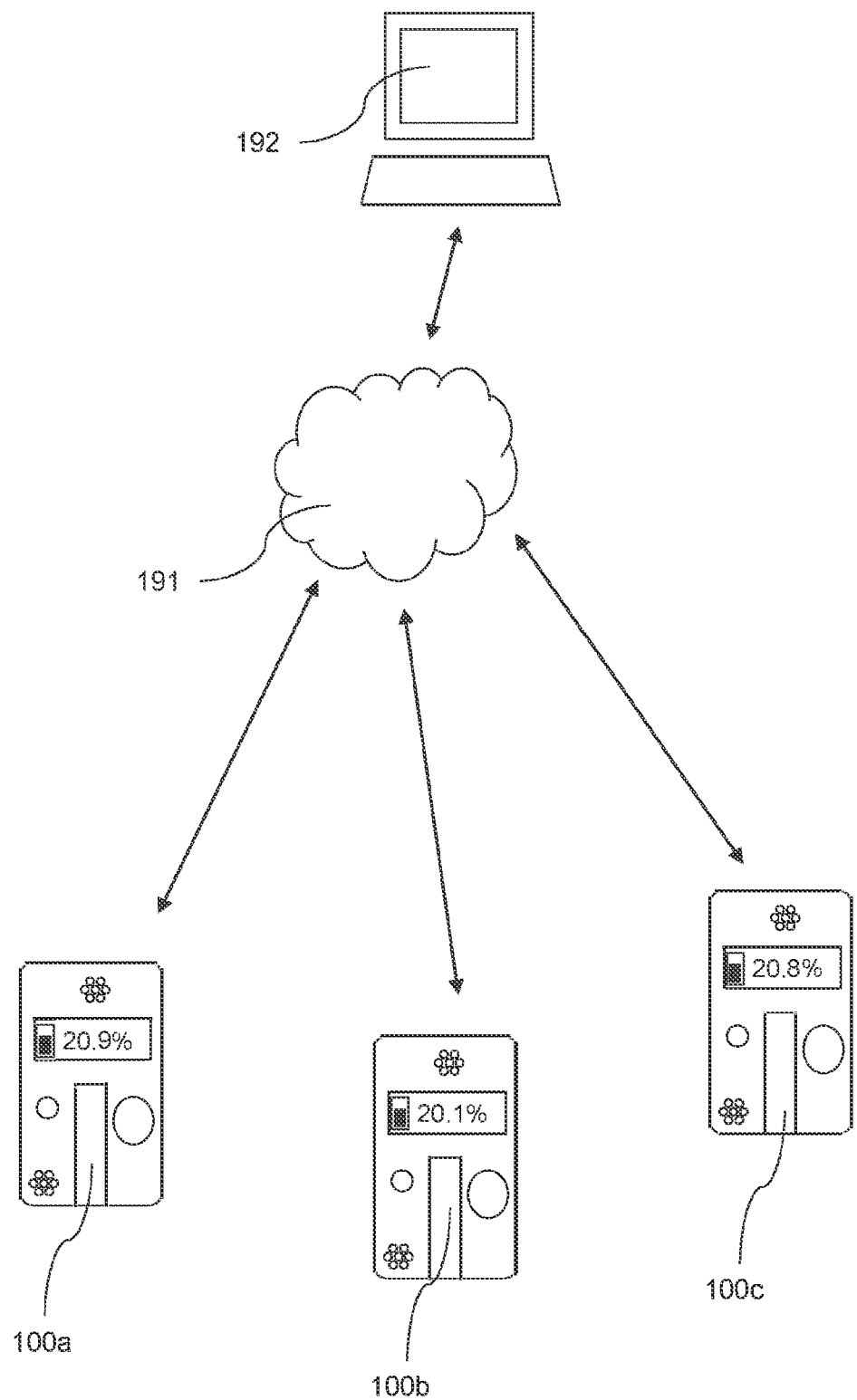
FIG. 1c is a schematic of a system comprising multiple portable personal gas detectors in communication with a remote computer.

FIG. 1c shows a system wherein multiple portable personal gas detectors 100a-c are in communication with a remote computer 192, in this case, via the cloud 191. This allows data to be aggregated and processed centrally. In the embodiment of FIG. 1c, the portable personal gas detectors comprise oxygen sensors.

Aggregating Data

Figure 2A:
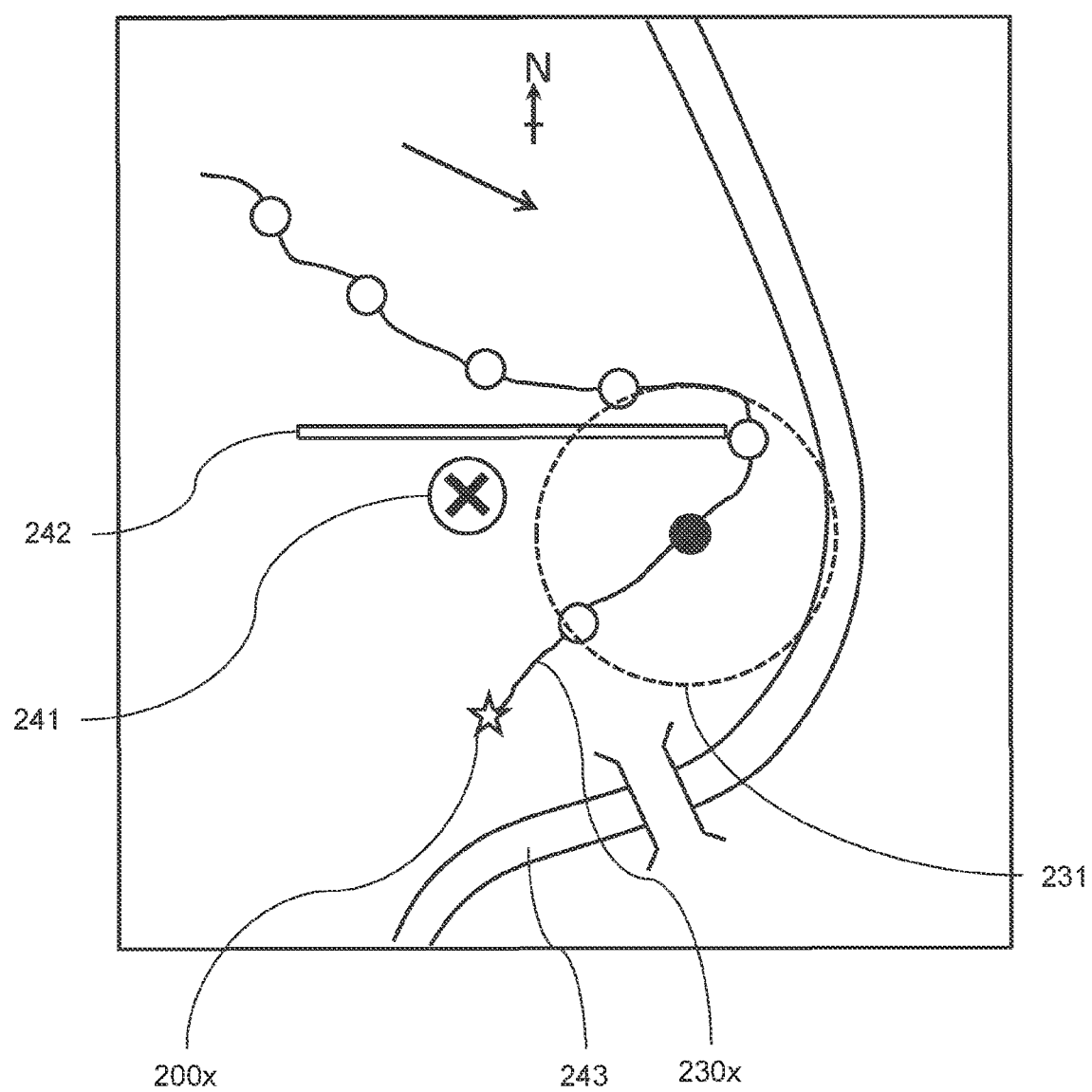
FIGS. 2a-c are a series of views showing how a remote computer would monitor multiple portable personal gas detectors and identify a zone of concern.
Figure 2B:
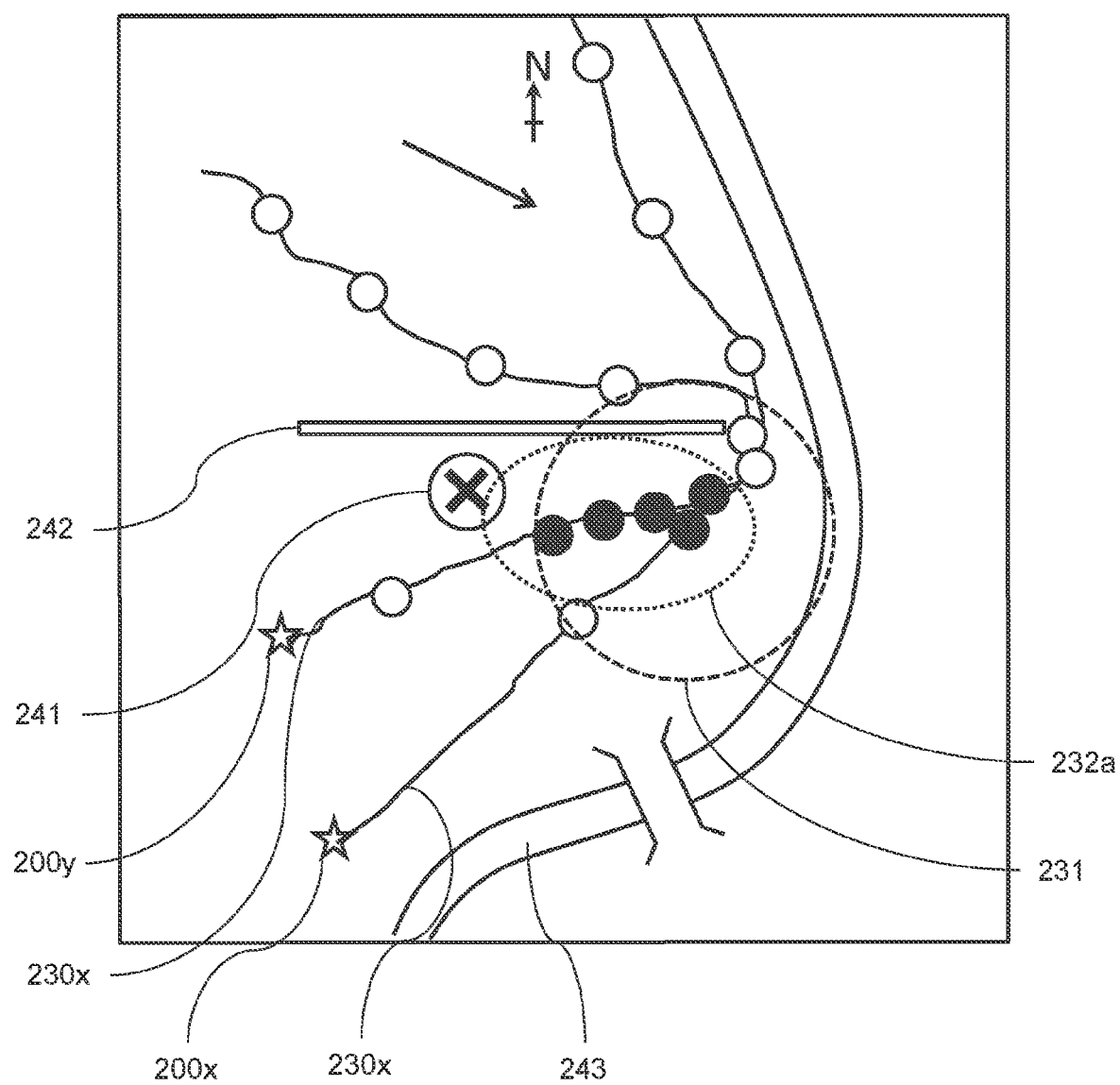
Figure 2C:
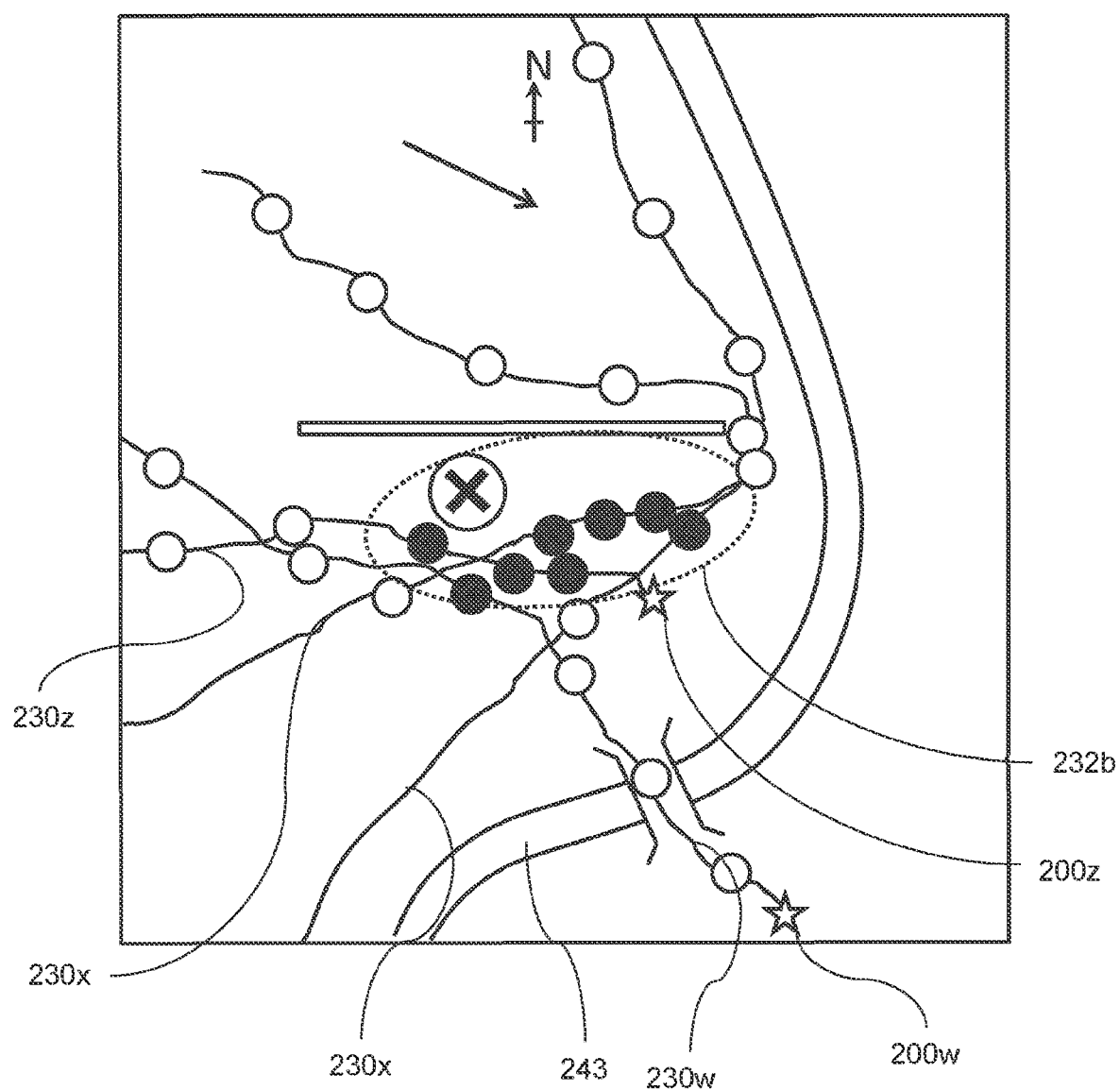

FIGS. 2a-2c shows a display of a remote computer as it receives information from a series of portable personal gas detectors. The gas detectors in this case are similar to those shown in FIG. 1a. The remote computer, in this case, comprises a processor and a memory comprising computer program code. When the computer program code is run on the processor, the remote computer is enabled to process the information received from the portable personal gas detectors and identify zones of concern. The remote computer comprises a transceiver for transmitting and receiving data wirelessly.

FIG. 2a shows a display view showing a portable personal gas detector 200x deployed in the field. The portable personal gas detector 200x has a location detector configured to determine the location of the portable personal gas detector and one or more gas sensors. The gas detector is configured to periodically determine its location and monitor the gas level associated with each determined location. In addition, the gas detector is also configured to measure environmental or user parameters and to activate an alarm if the measured environmental or user parameters go beyond a predetermined range. In this case, the alarm is raised when the gas level is within a dangerous-level range.

In this case, the portable personal gas detector 200x is configured to determine its location and associated gas level based on a spatial frequency. That is, when the portable personal gas detector 200x has moved a pre-determined distance, the location and associated gas level are determined. The motion of the portable personal gas detector may be monitored by monitoring the absolute location of the portable personal gas detector in an ongoing manner, or by detecting motion using, for example, accelerometers. Other embodiments may be configured to determine location and associated gas level based on a temporal frequency.

In this case, the portable personal gas detector 200x has two modes: an active mode and a passive mode. The active mode may be used when the user is in an area which is considered potentially dangerous (e.g. when the user is working on repairing a gas line). The passive mode may be used when the user is not in an area which is considered dangerous (e.g. when he is on his way to a task within the work site). The frequency at which the portable personal gas detector is configured to determine the location and associated gas levels may be dependent on whether the portable personal gas detector is in a passive or active mode. However, even in the passive mode, the portable personal gas detector may still be configured to repeatedly determine gas levels and associated locations. That is, the passive mode is not an inactive mode.

In this case, the environment in which the system is deployed comprises a furnace 241, a wall 242, and a river 243. The current prevailing wind 246 in this example is from the west. Information relating to the current conditions may be obtained from the portable gas detectors and/or fixed gas detectors (e.g. a fixed weather station). The prevailing conditions may be reported to the remote computer and used to identify the zone. For example, the remote computer may look for zones which are elongated along the prevailing wind direction.

In this case, portable personal gas detector 200x comprises a sensor configured to detect carbon monoxide.

In the situation in FIG. 2a, portable personal gas detector 200x has moved through the area periodically sampling the gas level. Each location at which the gas level is detected corresponds to a circle along the route 230x. A safe-level reading corresponds to a white circle and a concern-level level reading corresponds to a black circle. In this case, the concern-level reading range is below the dangerous-level range at which an alarm is activated and a safe-level reading range which is considered normal. That is, a concern-level reading corresponds to a possible or developing threat rather than an immediate risk to the user.

As shown in FIG. 2a, portable personal gas detector 200x has moved through the area and has confirmed that much of the route corresponds to safe-level gas levels. However, at one point, a concern-level reading has been recorded. In this case, no alarm is raised, and the user moves on as normal and the next reading along the route returns to a safe-level reading. It will be appreciated that, solely based on this set of circumstances, the one concern-level reading may be interpreted as an anomalous result.

In this embodiment, the portable personal gas detector is not configured to change its own sampling rate. In other embodiments, detecting a concern-level reading after a safe-level reading may prompt the portable personal gas detector to automatically increase the sampling rate as it exceeds the lower threshold of the concern-level range (e.g. by switching from a passive mode to an active mode). Likewise, detecting a safe-level reading after a concern-level reading may prompt the portable personal gas detector to automatically decrease the sampling rate as it moves from the a concern-level reading to a safe-level reading (e.g. by switching from an active mode to a passive mode). The decrease in sampling rate may be based on one or more of: number of safe-level readings since last concern-level reading, distance from location associated with concern-level reading, and time since the concern-level reading was made.

In this case, the gas level reading and associated locations are sent to the remote computer which identifies the concern-level reading and the associated location. At this stage, the remote computer enables communication with other devices in the area of the location of the concern-level reading.

FIG. 2b shows the situation when another portable personal gas detector 200y moves through the area. In this case, the portable personal gas detector 200y has received information on the concern-level reading (e.g. from the remote computer) and is configured to increase the rate of sampling within a predetermined radius 231 of the concern-level reading.

As the portable personal gas detector 200y moves through the area along its route 230y, it samples at a normal (reduced) rate until it is within the predetermined radius 231 of the concern-level reading, where the sampling rate is increased. Again, after an initial safe-level reading, the gas detector determines a series of concern-level readings. As these readings are below the alarm threshold (e.g. outside the dangerous-level range), an alarm is not raised. The gas detector moves on as the user continues his route 230y, and the gas detector again measures a safe-level reading.

At this stage, the remote computer identifies a zone of concern 232a associated with elevated gas levels. This area comprises readings from multiple detectors at multiple different times. The system may be configured to notify someone at the site that there is a potential problem which should be investigated.

In this case, the zone of concern 232a is configured to encompass the locations associated with concern-level readings and not locations associated with safe-level readings. In addition, in this case, the remote computer is configured to limit the distance between a concern-level reading at the edge of a cluster and the boundary. This sets a boundary within which there may be a problem. It will be appreciated that the increased sampling rate of the second portable gas detector allows the system to better define the boundary of the identified area by placing it between the safe-level reading and the medium level reading of the second portable gas detector.

FIG. 2c shows how the situation might develop before the situation is investigated with a view to fixing the problem. In FIG. 2c, two further users with portable detectors 200w,z have moved through the area along routes 230w,z.

In this case, the system is configured to instruct portable detectors in the area to increase the sampling frequency within a predetermined area of the identified zone of concern 232a (as shown in FIG. 2b). Again, a number of concern-level readings are recorded. This allows the remote computer to update and delineate more clearly the zone of concern 232b. That is, the boundary of the zone of concern 232a,b is updated as more information is received from the portable gas detectors. This also would help workers on the site identify the source of the problem.

In this scenario, all of the portable detectors 200w-z are identical or at least sensitive to the same gas. In this embodiment, if a worker were to enter the identified area with a portable personal gas detector without a gas sensor sensitive to the gas associated with the identified zone, the remote computer would transmit an alert to that user to leave the area. This alert may be different from an alarm indicating a dangerous situation, but it may include audio-visual components. For example, an alarm might be a particular tone with flashing lights, and a warning to leave might be a different tone with a light of a different colour (e.g. orange instead of red).

Likewise, if a user or gas detector spent too long a time within the identified zone of concern, an alert may be initiated. The time may be dependent on the levels of gas detected within the identified area (or on a risk score associated with the identified area). For example, if the gas levels within the identified area were close to dangerous levels, the acceptable period of time for a user to remain within the identified zone of concern may be shorter than if the gas levels were closer to safe levels.

In this way, problem areas within an environment may be proactively identified based on using the portable detectors as they move throughout the area.

In addition to allowing a threat to be solved before it reaches dangerous levels, the identification of a zone may help mitigate the risks of a threat should the situation deteriorate. For example, after a zone is identified, if an alarm is activated within the zone (e.g. in response to dangerous levels of gas being detected), then the remote computer may be configured to activate the alarms of all gas detectors within that zone. That is, the spatial extent of the dangerous levels of gas may be determined in advance of the detected threat based on the identified zone.

Figure 2D:
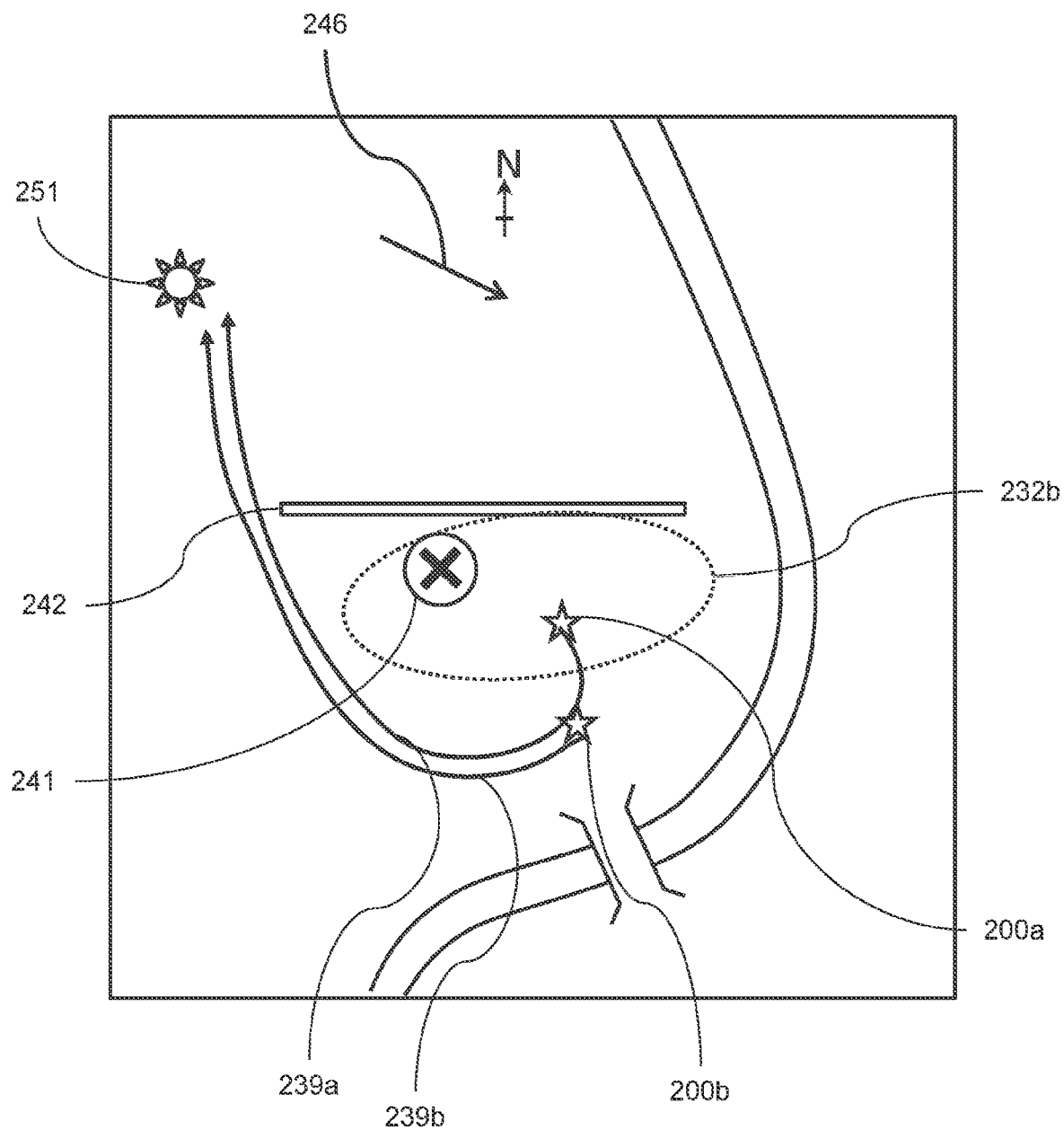
FIG. 2d is a view showing how a remote computer would calculate an evacuation route based on the identified zone of concern.

FIG. 2d shows how the system might generate an evacuation plan based on the identified zones.

In response to receiving the alarm activation signal, the controller is configured to determine an evacuation route 239a,b for each of the portable monitor gas detectors 200a-b within a predetermined range of the identified zone 232b. It will be appreciated that, in other embodiments, an evacuation plan may be determined for each of the portable monitor gas detectors within a predetermined range of the monitor gas detector which activated the alarm.

In this case, each evacuation plan is based prevailing environmental conditions (including wind direction and speed); physical barriers; and the configuration of the identified zone of concern. In this case, the nature of the threat is a gas which may be damaging to inhale. Based on this information, the controller determines that each user of a portable monitor gas detector 200a-b should move to a safe muster point.

A conventional system may be configured to calculate the closest route from the current position of the gas detector to the muster point 251, taking into account the physical barriers in place. In contrast, the present technology may be configured to calculate the evacuation route based on one or more of: cumulative exposure to gas along the evacuation route; and/or peak exposure to gas along the evacuation route.

In this case, therefore, when an alarm is raised, the portable gas detector 200b which is already outside the identified zone of concern is provided with an evacuation route which avoids the identified zone of concern. For the portable gas detector 200a within the zone of concern, the remote computer is configured to calculate an evacuation route which allows the user of the portable personal gas detector to exit the zone of concern as quickly as possible. In both cases, this has the counterintuitive result of the users of both portable gas detectors initially moving away from the muster point in order to remain safe until they reach the muster point 251.

Other Options

The portable personal gas detector system may be configured to monitor gas levels dynamically, and transmit this monitoring data to a server for real-time analysis. This preferred embodiment allows existing systems to augment "heat maps" or "hot zones" where ambient gas levels may become unsafe. Without the dynamic action of a connected portable gas detector carried by a user, the constant feedback loop of atmospheric quality would be limited to only the fixed gas detectors; or, what is otherwise reported manually by a user when their traditional gas detector goes into alarm.

In the preferred embodiment, the gas detector has a series of health and warning indicators. The gas detector signals its own functional status (e.g. power, connectivity, etc.); while simultaneously being fully capable at receiving messages. In such embodiment, the detector has a colored light that illuminates upon receiving a muster alarm. The muster alarm may be networked to a single gas detector or multiple gas detectors from a physical connected base station or administrators control panel accessed via the internet.

In many embodiments, the sensors may be doing more than just sending the raw data. For example, the portable personal gas detector may be configured to perform calculations (using a processor) to provide instant feedback to the user as well as the remote monitoring center. For example, the gas detector may be configured compare detected gas levels with thresholds to determine a threat level. Some embodiment may also be configured to integrate readings from two or more of: temperature, humidity, raw gas readings, compensation curves as well as potentially other sensor information (such as $O_2$ when reading explosive gas). These may be combined to intelligently decide on what to show the user as well as what to send and log in the remote server. That is, the portable personal gas detector is configured to intelligently log the event so that help can be delivered (or a phone call can be made) and we can report on these events and trends in the future.

Transmission of the data and or alerts may be performed using a combination of 900 MHz and cell/sat with our data. This may increase range and provide remote coverage worldwide not within a short range. Short range communications may also be used.

As noted above, data is sent a server for processing which can be used for immediate help but also for automatic functionality/analysis. Using a centralised processor helps allow a multitude of actions to be processed all at the same time as well as trends to be identified and reported (to help proactively prevent them from happening in the future).

As noted above the system is configured to intelligently make decisions. For example, the server configuration which can be accessed remotely allows an alert response center anywhere in the world to monitor the people and the portable personal gas detectors. The server arrangement also allows multiple people to monitoring them. The safety workflow in our system is configured to analyze the alerts and/or threats and to make decisions. The data is recorded and reported to provide analytics on individual events or across all events (e.g. identifying trends).

Some embodiments are configured to generate local and remote (e.g. remote audio/visual alarms. Safety workflows are configured to analyze and make decisions to help the responder help as efficiently as possible.

Aside from GPS some embodiments may be configured to use indoor location technology such as beacons. The beacons emit a unique identifier which is detected by the gas detector. The gas detector can decide what the strongest beacon it detects is and then sends that to our server. The server then has a longitude and latitude association with the beacon ID (or other position information) and is configured to intelligently put the user to that location on our map. This allows accurate locations without relying on the user telling us where they are or GPS which does not work well indoors.

As noted above, the system may be configured to use a combination of GPS and beacon locations to intelligently predict the closest location. This means an area can be outfitted with beacons and the gas detector will make intelligent decisions on what it thinks its best location is (be it a GPS signal and/or a beacon ID). This is then processed with our database in the backend to relay where the user is on a map. The system may be configured to react to a location, not just make a decision based on the location. This means if the gas detector detects a beacon the gas detector could make a decision based on that beacon and not the location. For example, the beacon may be associated with information such as particular threats.

A beacon may me considered to be a transmitter that emits an ID (e.g. via invisible electromagnetic radiation such as radio waves) that can be processed and sent to a server to identify a location (e.g. each ID may be associated with a location).

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method for detecting gas hazards comprising:
   repeatedly determining gas levels and associated locations of multiple portable personal gas detectors as each gas detector is moved;
   transmitting the determined gas levels and associated locations to a remote computer;
   collating the determined gas levels and associated locations by the remote computer; and
   identifying, by the remote computer, one or more zones of concern associated with gas levels within a predetermined range detected by multiple gas detectors at different times,
   wherein the zones of concern are identified based on one or more of:
      a period of time over which gas levels within the predetermined range were detected;
      a number of gas levels readings within the predetermined range within a zone;
      a number of detectors detecting gas levels within the predetermined range;
      a number of detectors not detecting gas levels within the predetermined range; and
      a proximity of the locations associated with gas levels within the predetermined range.

2. The method of claim 1, wherein the method comprises providing feedback to the remote computer relating to whether or not the identified one or more zones of concern was associated with a fault; and using the feedback to automatically refine criteria used to identify the zones of concern.

3. The method according to claim 1, wherein the method comprises increasing a frequency at which the gas levels and associated locations are determined within a predetermined proximity around one or more positions where gas levels within the predetermined range have already been detected.

4. The method according to claim 1, wherein the method comprises adjusting a frequency at which the gas levels and associated locations are determined within a predetermined proximity of an identified one or more zones of concern.

5. The method according to claim 1, wherein the method comprises providing an alert via one of the portable personal gas detectors in response to the portable personal gas detector remaining in an identified zone of concern for a period of time exceeding a threshold value.

6. The method according to claim 1, wherein the method comprises notifying gas detectors within the identified zone of concern which do not have sensors configured to detect the gas associated with the identified zone of concern.

7. The method according to claim 1, wherein each portable gas detector is configured to initiate an alarm if the gas level is within a predetermined dangerous-level range, and wherein the gas detector is configured to monitor and transmit gas levels corresponding to a concern-level range, the concern-level range being outside the dangerous-level range.

8. The method according to claim 1, wherein each portable gas detector is configured to adjust a frequency at which the gas levels and associated locations are determined in response to the gas level passing between a concern-level range and a safe-level range.

9. The method according to claim 1, wherein each identified zone of concern corresponds to a zone in which more than 50% of gas detectors in that zone detected gas levels within a predetermined range for an uninterrupted period of time.

10. The method according to claim 1, wherein each identified zone of concern is surrounded by determined locations which are associated with normal gas levels.

11. The method according to claim 1, wherein the identified zones of concern are given a risk score, the risk score being determined based on:
   the period of time over which gas levels within the predetermined range were detected;
   the number of detectors detecting gas levels within the predetermined range;
   the number of detectors not detecting gas levels within the predetermined range; and
   the proximity of the locations associated with gas levels within the predetermined range.

12. The method according to claim 1, wherein the method comprises, in response to an alarm being activated within the identified zone, determining an evacuation plan one or more gas detectors, the evacuation plan comprising a route from a current location of each gas detector to an end point while minimizing exposure to gas.

13. The method according to claim 1, wherein each portable personal gas detector is configured to identify if the determine gas level is within the predetermined range, and wherein each portable personal gas detector is configured to not transmit determined gas levels within a safe-level range, the safe-level range being outside the predetermined range.

14. The method according to claim 1, wherein the location is determined using GPS.

15. The method according to claim 1, wherein each gas detector is configured determine the level of one or more of: carbon monoxide, hydrogen sulfide, nitrogen dioxide; airflow; and lower explosive limit.

16. The method according to claim 1, wherein the remote computer is constrained to identify zones with a predetermined shape.

17. The method according to claim 1, wherein the method comprises enabling, by the remote computer, display of the one or more identified zones.

18. The method according to claim 1, wherein the method comprises transmitting, by the remote computer, a position and shape of the identified zone.

19. A system comprising:
multiple portable personal gas detectors configured to repeatedly determine gas levels and associated locations of multiple portable personal gas detectors as each gas detector is moved, and to transmit the determined gas levels and associated locations to a remote computer; and
the remote computer configured to collate the location and associated gas levels at the remote computer; and identify zones of concern detected by multiple gas detectors at different times,
wherein the zones of concern are identified based on one or more of:
a period of time over which gas levels within a predetermined range were detected;
a number of gas levels readings within the predetermined range within a zone;
a number of detectors detecting gas levels within the predetermined range;
a number of detectors not detecting gas levels within the predetermined range; and
a proximity of the locations associated with gas levels within the predetermined range.

* * * * *